Nov. 14, 1933.                C. H. WHITE                1,934,899
                        AGRICULTURAL IMPLEMENT
                         Filed March 19, 1930
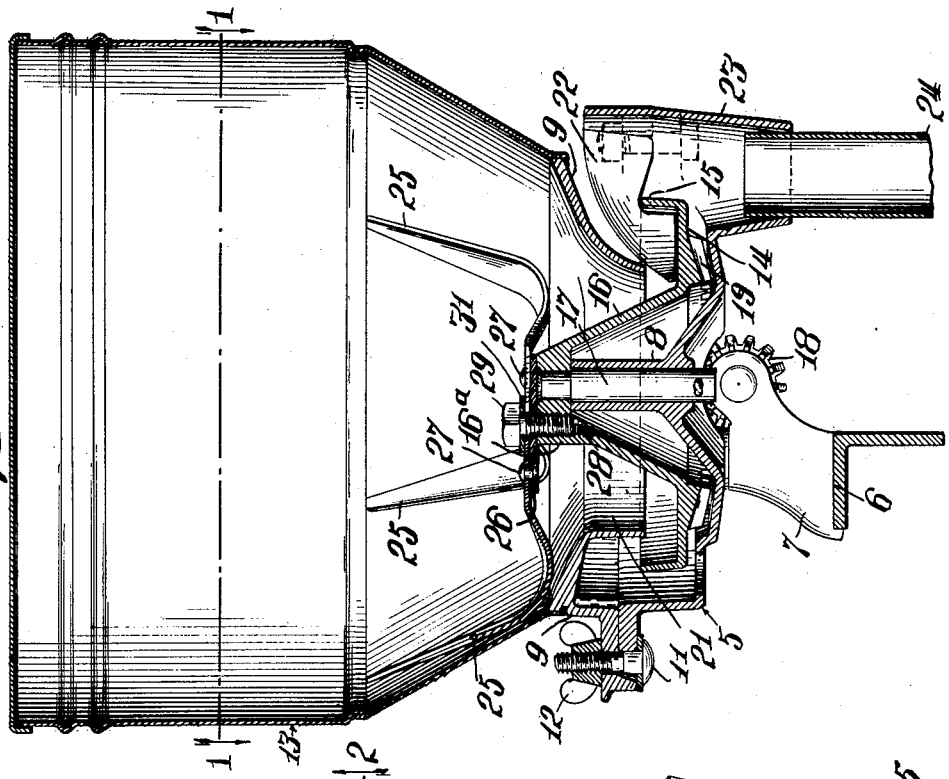
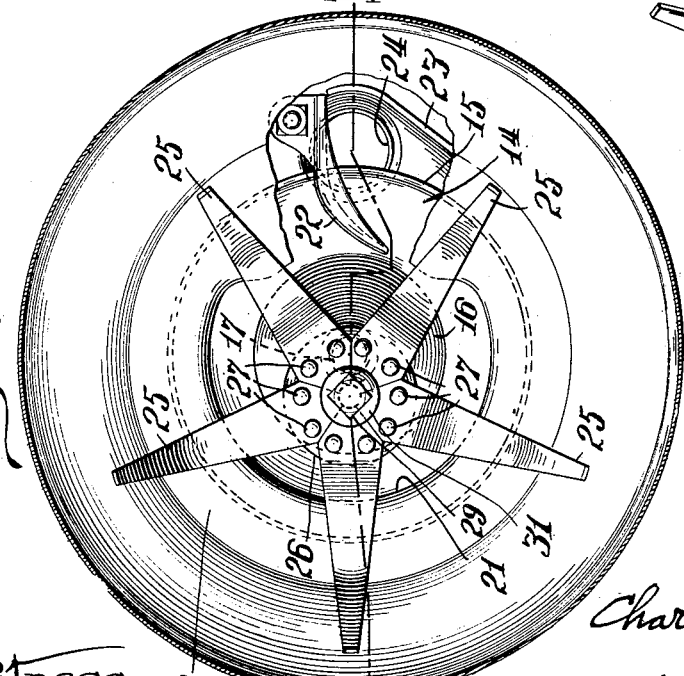
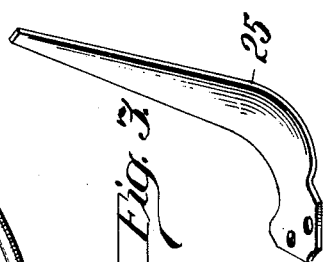
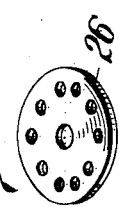
Inventor
Charles H. White
By Brown, Jackson, Boettcher & Dienner
Attorneys.
Witness
Milton Lenoir Patented Nov. 14, 1933

1,934,899

UNITED STATES PATENT OFFICE 1,934,899

AGRICULTURAL IMPLEMENT

Charles H. White, Moline, Ill., assignor to Deere & Company, Moline, Ill., a corporation of Illinois Application March 19, 1930. Serial No. 436,919

9 Claims. (Cl. 221—120)

The present invention relates to improvements in agricultural implements, and more particularly to fertilizer distributors. In planters used for planting certain kinds of seeds, such as corn and cotton for example, the implement is frequently provided with a fertilizer distributing attachment in the form of a hopper or can for holding a quantity of fertilizer, said hopper being provided with a downwardly extending chute for delivering the fertilizer to the seed bed adjacent to the seed which has been deposited by the seeding mechanism. These fertilizer hoppers are generally provided with agitating means therein for continuously agitating and stirring up the fertilizer contained therein so that it will not become packed in the hopper and thus fail to feed properly to the fertilizer distributing tube.

In prior devices it has been customary to provide an agitator in the form of a rotating plate disposed adjacent to the bottom of the hopper and provided with an upwardly extending hub to which was rigidly connected a single arm which rotated about an axis concentric with the vertical axial center line of the hopper. This arm extended outwardly to near the wall of the hopper and then upwardly so that as the plate was rotated said arm would be moved through the fertilizer in the hopper, thereby constantly stirring the fertilizer and insuring a continuous and uniformly proportioned feed from the hopper. However, this single arm construction has been found subject to certain objections due principally to the relatively great leverage acting through the arm whereby said arm sometimes broke making it necessary to replace it. Furthermore, owing to the fact that this single arm had to move through the entire mass of fertilizer contained in the hopper, a disproportionate amount of power was required to operate the agitator, with the result that the gears provided for driving it were subject to considerable wear. Also, in horse drawn implements in which the fertilizer distributor mechanism employing the old type of agitating arm is driven from the ground wheel of the implement it required so much power to operate such arm as to often cause slippage of the wheels.

With the above-mentioned difficulties in view, it is one of the principal objects of my present invention to provide an agitator comprising a plurality of arms which will more thoroughly stir up the fertilizer contained in the hopper and which can be efficiently operated with less power, thereby causing less wear on the operating parts. Another object of the invention is to provide an agitator comprising a plurality of radially extending arms which are so moved through the fertilizer in the hopper that the danger of breakage of the arms is reduced to the least possible degree.

A further object of the invention is to provide a fertilizer agitator which will have a gyratory motion; or more specifically, to so mount the agitator arms for free movement on a pivot, which pivot is positioned eccentrically with respect to the vertical axial center line of the hopper and is rotatable thereabout whereby each arm has a radial movement combined with a rotational movement within the hopper.

A still further object of the invention is to provide an agitator having a motion by which there will be no tendency for the heavier ingredients to separate from the lighter ingredients of the fertilizer compound, or the smaller particles to separate from the larger particles thereof. In the preferred embodiment of my invention this is attained by mounting the agitator arms so that they will have a comparatively slow gyratory motion through the fertilizer in the hopper.

In the drawing:—

Figure 1 is a view looking downwardly into the fertilizer hopper, being a horizontal section taken on the plane of the line 1—1 of Figure 2, and illustrating in plan the stirring arms of the agitator;

Figure 2 is a vertical cross-section taken on the plane of the line 2—2 of Figure 1, illustrating my improved agitator in position within the hopper, and illustrating the means for driving the same;

Figure 3 is a perspective view of one of the stirring arms of the agitator; and

Figure 4 is a perspective view of the mounting plate for the inner ends of the stirring arms.

Referring to the drawing,

The fertilizer attachment comprises a base member 5 in the form of a suitable casting mounted on a frame member 6 of the implement by means of a supporting bracket 7 in any appropriate manner. Formed integral with said base member 5 and extending upwardly therefrom in the axial vertical center line of the hopper is a bearing sleeve or boss 8 on which the agitator to be hereinafter described is rotatably mounted.

A hopper or can supporting member 9 in the form of a suitable casting is positioned above the base member 5 and connected therewith by means of a plurality of bolts 11 at spaced points around the periphery thereof, said bolts being held in position by wing nuts 12, as shown in Figure 2. The hopper supporting member 9 is thus detachably connected to the base portion 5 so that it with the hopper carried thereby may be easily removed for access to the parts located therein. A hopper or can 13 is mounted on supporting member 9, to which it is suitably secured in any appropriate manner.

A rotating circular feed plate 14, having an upturned peripheral margin 15 and a hollow cone-shaped hub member 16 extending upwardly in the center thereof, is secured to the upper end of a bearing pin 17, the lower portion of which pin is journaled within the sleeve 8 above described. Said sleeve 8 extends upwardly within the hollow cone-shaped hub member 16, the lower surface of the apex of the cone resting upon the top edge of the sleeve 8 as shown. It will be seen, therefore, that the plate 14 rotates about a pivot center defined by the bearing pin 17.

The feed plate 14 is rotated by means of a bevel pinion 18 suitably journaled on the bracket 7 and driven in any appropriate manner from the implement as usual. This pinion engages with bevel teeth 19 formed in the under face of the plate 14, the base member 5 being provided with a suitable opening for permitting such engagement between said teeth and pinion.

The hopper supporting member 9 is provided with inwardly and downwardly sloping sides and has a large central opening 21 leading down on to the rotating plate 14, the fertilizer in the hopper dropping through this opening on to the plate 14 in the operation of the device. As the plate 14 revolves the fertilizer deposited thereon through said opening is carried around on the plate until it comes into contact with a shovel 22 which scrapes the fertilizer from the plate and into the funnel 23 from whence it is delivered to the tube 24 through which it drops down to the seed bed. The parts so far described are old and well known in the art and in and by themselves form no part of my present invention.

Coming now to the improvements to which my present invention relates, the conical hub 16 of the rotating feed plate has mounted thereon as hereinafter described a plurality of stirring arms or fingers 25, five of these arms being shown and the configuration of each of which is best shown in Figure 3. These five arms are positioned in star formation as shown in Figure 1,—that is to say, they extend radially outwardly from a common center in substantially equal angular spacing. The arms 25 are connected together at their inner ends by means of a circular plate 26 to which they are secured by rivets 27 or in any other appropriate way. The apex of the cone-shaped hub portion 16 is provided with a laterally extending lug portion 16a, as shown in Fig. 2, in which is provided a screw threaded bore 28 extending vertically therethrough for receiving a pivot bolt 29, and the plate 26 carrying the stirring arms 25 is mounted on said pivot bolt for free rotative movement thereon. As shown, a washer 31 is interposed between the head of the bolt and the plate 26. Thus the pivot bolt 29 provides a common axis for the several arms 25 that is disposed eccentrically to the axis 17 of the feed plate 14, which constitutes a supporting member on which the arms 25 are mounted for free rotation with respect to the hopper.

Consequently as the supporting member or plate 14 is rotated by the pinion 18 the agitator arms will have a gyratory motion, gyrating about the axis 17 of said member 14 and also rotating about their own common axis 29. By virtue of this gyratory motion the arms 25 will have radial movement and also rotational movement with respect to the inside of the hopper and its contents, with the attendant advantages of loosening the fertilizer more effectively, and requiring less power to operate, with consequent less danger of breakage. Owing to the mounting of said arms for free rotation with respect to the hopper they are free to lag behind the motion of the supporting member 14 if the materials in the hopper unduly resist their rotational movement, which further reduces the danger of breakage.

I wish it to be understood that while I have illustrated and described five radially extending arms positioned in star formation and mounted to rotate about an axis eccentric to the axis about which the plate 14 rotates my invention is not to be limited to any specific number of such arms, as it would be within the scope of the invention to so mount a greater or less number of such arms as desired. I also wish it to be understood that my improved agitator is not to be limited to use in connection with a fertilizer distributing hopper, as it might be used in a seed hopper or in any other like situation for which it is adapted.

I claim:

1. The combination with a hopper, of an agitator cooperating therewith comprising a rotating plate, and a plurality of arms of equal length pivotally mounted to rotate freely on said plate about a pivot center disposed eccentrically to the pivot axis of said plate.

2. The combination with a hopper adapted to contain material, of an agitator cooperating therewith comprising a rotating plate, and a plurality of radially extending arms of equal length pivotally mounted to continuously rotate on said plate about a pivot center disposed eccentrically to the pivot axis of said plate, said arms in operation being rotated in the opposite direction from that of said plate by contact with the material in the hopper.

3. The combination with a hopper, of an agitator comprising a supporting member mounted for rotation about an axis in said hopper, and a plurality of outwardly extending agitator arms connected together and mounted on said supporting member for free rotation thereon with respect to the hopper about a common axis disposed eccentrically with respect to the axis of said member, the outer ends of said arms being free to lag behind the motion of said supporting member and to be moved in and out substantially radially by rotation of said supporting member.

4. An agitator for fertilizer distributing hoppers comprising a plurality of outwardly and upwardly extending members of equal length connected together in star formation and rotatable in either direction about a pivot disposed eccentrically with respect to the vertical axial center of the hopper.

5. An agitator for fertilizer distributing hoppers comprising a rotatable plate, a second plate spaced upwardly therefrom and pivotally mounted on said first named plate to rotate freely thereon about an axis passing through the geometrical center of the second plate and disposed eccentrically to the pivot axis of said first named plate, and a plurality of arms of equal length extending outwardly and upwardly from said second named plate.

6. An agitator for fertilizer distributing hoppers comprising a base, a centrally located sleeve extending vertically from said base, a pivot pin in said sleeve and extending upwardly therefrom, a rotatable plate comprising a hollow hub member surrounding said sleeve and mounted on said pivot pin, and a plurality of radially and upwardly extending arms mounted on said hub member eccentrically with respect to said pivot pin.

7. An agitator for fertilizer distributing hoppers comprising a base, a centrally located sleeve extending vertically from said base, a pivot pin journaled in said sleeve and extending upwardly therefrom, a plate comprising a hollow hub member surrounding said sleeve and mounted on said pivot pin, and a plurality of radially and upwardly extending arms rotatably mounted on said hub member eccentrically with respect to said pivot pin.

8. Fertilizer distributing means comprising a hopper, a base, a centrally located sleeve extending vertically from said base, a pivot pin journaled in said sleeve and extending upwardly therefrom, a feeding plate comprising a hollow hub member surrounding said sleeve and mounted on said pivot pin, a plate rotatably mounted on said hub member eccentrically with respect to said pivot pin, a plurality of radially and upwardly extending agitating arms secured to said plate and rotatable therewith, a discharge duct, and means for discharging the fertilizer from said feeding plate to said discharge duct.

9. An agitator for fertilizer distributing hoppers comprising a base, a centrally located sleeve extending vertically from said base, a pivot pin in said sleeve and extending upwardly therefrom, a plate comprising a hollow hub member surrounding said sleeve and mounted on said pivot pin, and a plurality of radially extending arms rotatably mounted on said hub member eccentrically with respect to said pivot pin.

CHARLES H. WHITE.